US006710643B1

(12) United States Patent
Rajeevakumar

(10) Patent No.: US 6,710,643 B1
(45) Date of Patent: Mar. 23, 2004

(54) CIRCUIT TECHNIQUE TO ELIMINATE LARGE ON-CHIP DECOUPLING CAPACITORS

(75) Inventor: Thekkemadathil V. Rajeevakumar, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/285,797

(22) Filed: Oct. 31, 2002

(51) Int. Cl.[7] .......................... G05F 1/575; H02M 3/156
(52) U.S. Cl. ......................... 327/540; 327/535; 323/284
(58) Field of Search ................................. 327/535, 536, 327/537, 538, 540, 541, 543; 323/266, 313, 282, 284; 363/59, 60, 74

(56) References Cited

U.S. PATENT DOCUMENTS 5,262,931 A * 11/1993 Vingsbo ...................... 363/16
5,587,894 A * 12/1996 Naruo ......................... 363/84

* cited by examiner

*Primary Examiner*—Timothy P. Callahan
*Assistant Examiner*—Terry L. Englund
(74) *Attorney, Agent, or Firm*—Eric W. Petraske; H. Daniel Schnurmann

(57) ABSTRACT

In an integrated circuit having an on-chip power supply, a voltage maintenance circuit includes a decoupling capacitor connected between the output node and ground, a supplementary capacitor connected between a supplementary node and ground and a controllable transistor connected between the two capacitor nodes, so that when the output voltage drops below a threshold a reference circuit turns on the controllable transistor, thereby supplying extra charge to the output node and restoring it to its design voltage more quickly than the power supply could.

20 Claims, 3 Drawing Sheets

CIRCUIT TECHNIQUE TO ELIMINATE LARGE ON-CHIP DECOUPLING CAPACITORS

TECHNICAL FIELD

The field of the invention is that of integrated circuits having on-chip power supplies.

BACKGROUND OF THE INVENTION

On-chip voltage regulators and dc to dc converters are increasingly used in integrated semiconductor chips. Charge pumps are typically used to convert supply voltages to higher voltages or to lower voltage. In voltage converters, the standard supply voltage is used to drive an oscillator. The oscillator signal is used in turn to charge the output up or down to the required value. Charge pumps usually use voltage regulation to compensate for process and supply voltage variations and to maintain the output at the required voltage level. They also use large decoupling capacitors to reduce ripple voltage when load current is drawn from the regulated output.

When the magnitude of the converted voltage output goes below the required levels, one or more pump cycles are needed to restore the output back to the required voltage.

DECOUPLING CAPACITOR

The oscillator frequencies used in these charge pumps are typically very small compared to the frequency of the active cycle. For example, a memory chip with-access time and cycle time less than 10 ns may use oscillator frequencies 1 MHz to 20 MHz. Even during an active cycle, load current is drawn from the regulated output only during a fraction of the active cycle. For example, for a system with active clock period of 10 ns, load current may be active only for 2 ns. The lower oscillator frequencies are used in the charge pump to minimize inefficiencies of the charge pump, as well as to reduce power consumption. As a result, several active chip cycles may take place during one pump cycle. A large decoupling capacitor is necessary during this time, to provide charge for the load current with low ripple in the output voltage of the charge pump. Decoupling capacitors occupy considerable chip area. Planar gate area capacitors, or trench capacitors, may be used for decoupling. Trench decoupling capacitors would use less area compared to planar capacitors, but trench capacitors would add to processing cost. Trench capacitors also have higher ohmic and parasitic losses associated with it.

SUMMARY OF THE INVENTION

The invention relates to a circuit technique that not only eliminates the need for large decoupling capacitors, but restores the output voltage to the required level at a faster rate.

A feature of the invention is an on-chip power supply that employs at least two decoupling capacitors connected in parallel.

A feature of the invention is the use of a smaller decoupling capacitor together with a supplementary capacitor for supplying reserve charge.

Another feature of the invention is a controllable connection for connecting the two capacitors in parallel when the output node declines in voltage by a threshold amount.

Another feature of the invention is the maintenance of the supplementary capacitor at a higher voltage than the decoupling capacitor.

DETAILED DESCRIPTION

Figure 3:
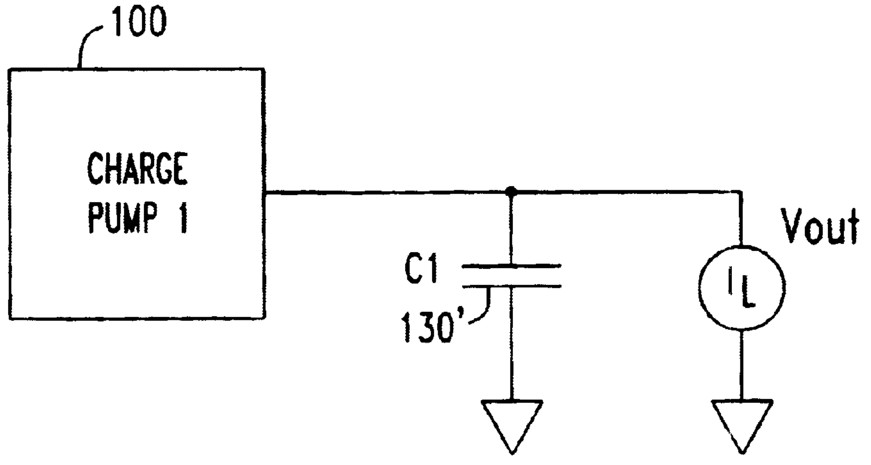
FIG. 3 (PRIOR ART)
FIG. 3 shows a schematic of a prior art circuit.

The typical output stage of a charge pump is schematically shown in FIG. 3. Charge is pumped and stored in the decoupling capacitor 130', and an output voltage $V_{out}$ is maintained. Note that $V_{out}$ can be positive or negative. When $V_{out}$ reaches the required magnitude, the pump is disabled. When the magnitude of $V_{out}$ goes below the required level due to leakage, or load current, the pump becomes active again. Ripple Voltage, $$dV=I_L t_a/(C1) \tag{1}$$

where $I_L$ is the load current and $t_a$ is the active time period.

Figure 1:
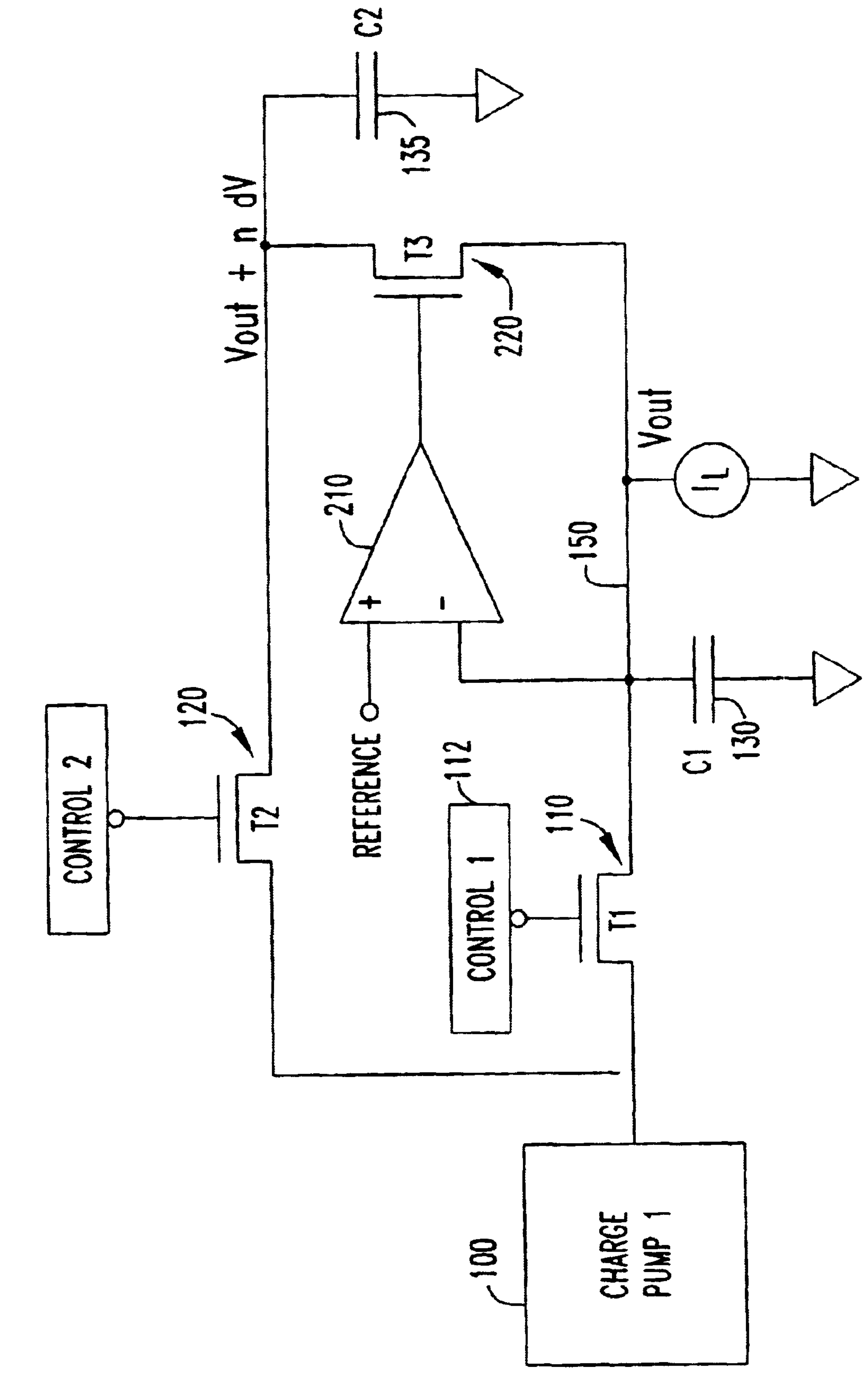
FIG. 1 shows a schematic drawing of the invention.
Figure 4:
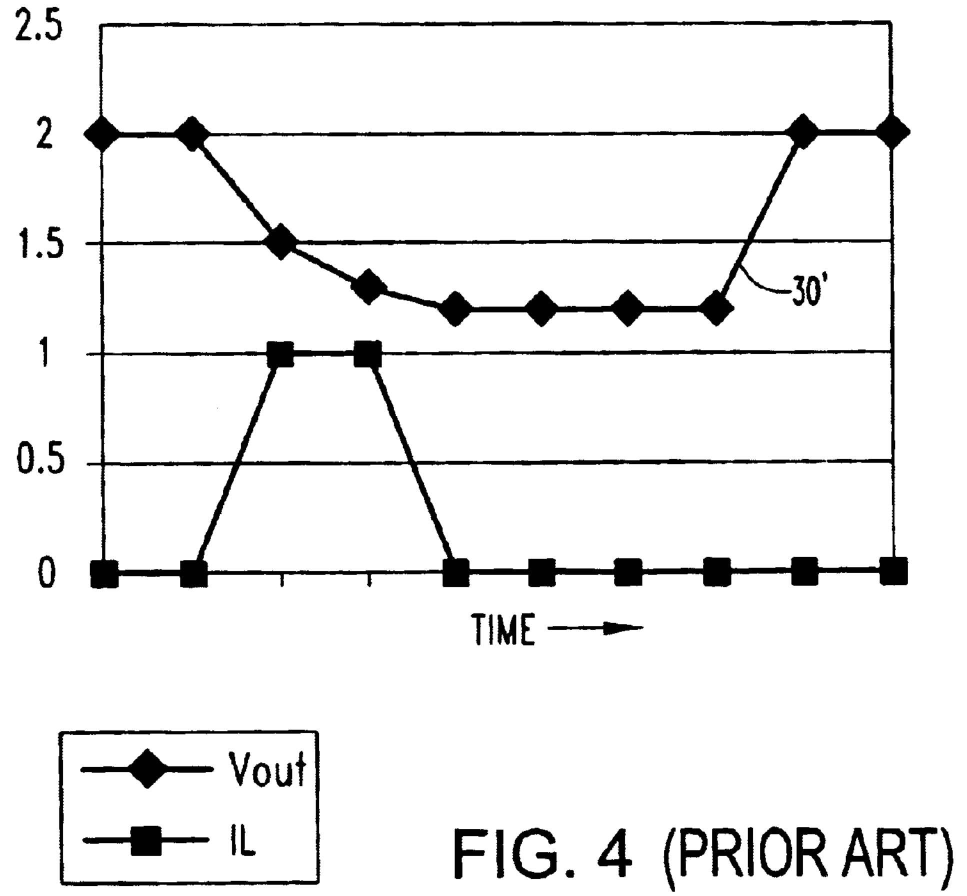
FIG. 4 (PRIOR ART)
FIG. 4 shows time dependence corresponding to FIG. 3.

A large decoupling capacitor is required to bring the ripple voltage dV to acceptable levels. FIG. 4 schematically shows how the load current affects the $V_{out}$ voltage in curve 30'. The load current brings $V_{out}$ down. Voltage $V_{out}$ stays low until the next pump cycle starts. One or more pump cycle may become necessary to restore $V_{out}$. In this example here, we are assuming $V_{out}$ to be positive. FIG. 1 shows a circuit according to the invention attached to the pump output to eliminate large decoupling capacitors. Capacitor 130 and capacitor 135 are two decoupling capacitors, T1 (110) and T2 (120) are transistors. T1 controls the charging of capacitor 130 and T2 controls the charging of capacitor 135. Normally transistor T3 (220) is turned off, capacitor 130 is charged to $V_{out}$ and capacitor 135 is charged to a storage voltage having a magnitude $V_{out}$+ndV, where n, the storage voltage factor, is any number and dV is the magnitude of the Ripple Voltage. The pump first charges capacitor 130 to $V_{out}$, and when capacitor 130 is not drawing current, capacitor 135 is charged to $V_{out}$,+n dV by the same pump 100.

The differential amplifier 210 that controls transistor T3 is fast, and its response time is very short compared to the active time period $t_a$. When the load current, $I_L$, is drawn from $V_{out}$, the magnitude of the voltage $V_{out}$ drops. During the active time period, if the magnitude of $V_{out}$ decreases, the differential amplifier turns the transistor T3 on, and $V_{out}$ is quickly restored. Charge is drawn from capacitor 135 until the capacitor 130 is charged to $V_{out}$. When $V_{out}$ is fully restored, T3 is turned off. Now the Ripple Voltage, $$dV=I_L t_a/(C1+nC2) \tag{2}$$

For simplicity, assume C1=C2=C. Now the Ripple Voltage becomes, $$dV=I_L t_a/(n+l)C \tag{3}$$

Thus, the decoupling capacitance can be effectively reduced by a factor of n. The additional elements used here are, control 1, control 2, transistors T1, T2, and T3, and the differential amplifier. The combined area for these is only a small fraction of typical decoupling capacitors. Note that $V_{out}$ can be positive or negative. What is important for a small ripple in the output voltage is that the magnitude of the sum of capacitance (C1+nC2). Preferably, the designer will choose capacitance C2 to be (1/n)C1.

Figure 2:
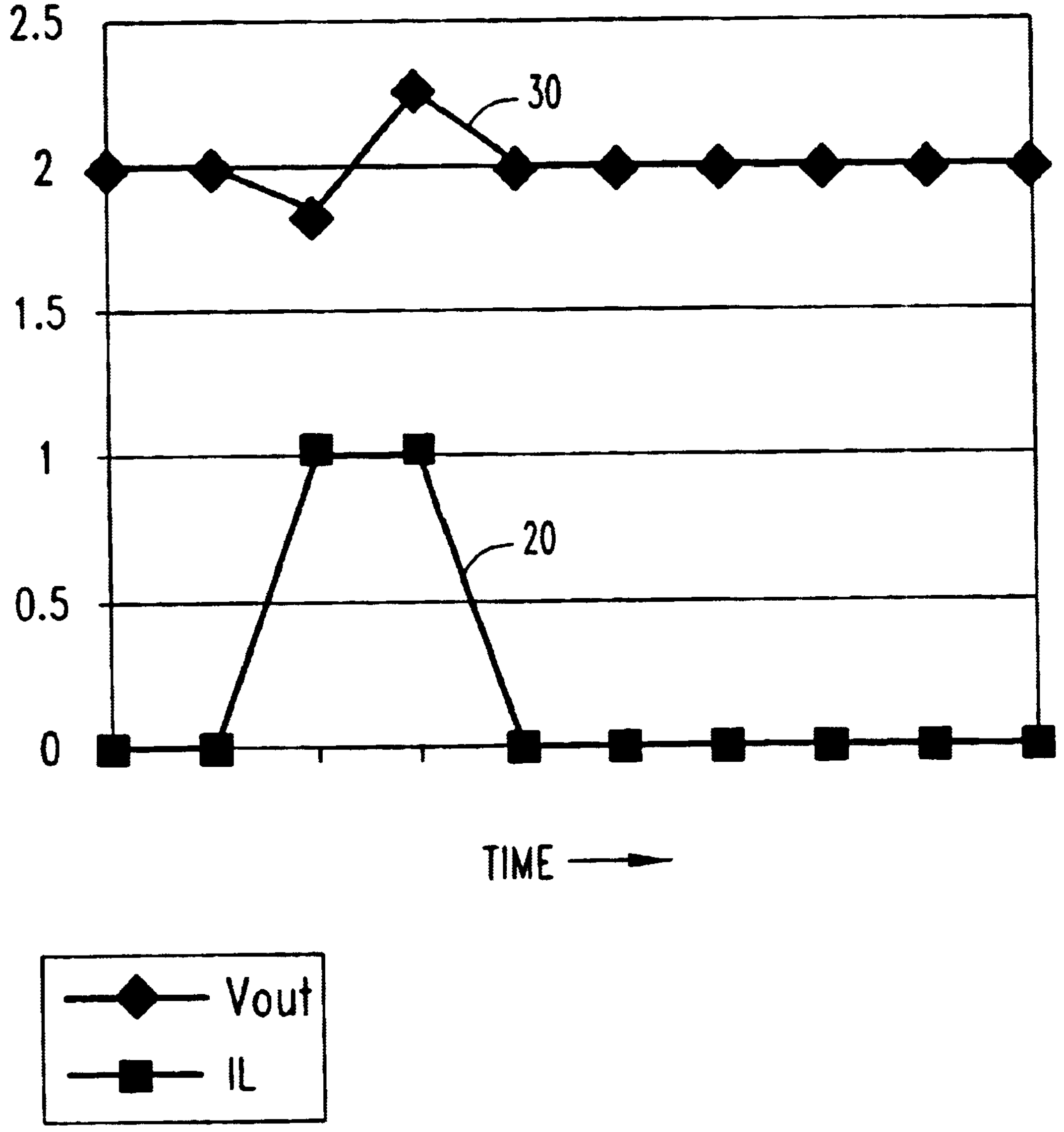
FIG. 2 shows the time dependence of voltage shift using the invention.

FIG. 2 schematically shows how the load current (curve 20) affects the $V_{out}$ voltage with the new circuit. The load current brings $V_{out}$ down. The differential amplifier detects this voltage drop, and turns T3 on. Charge is now transferred from capacitor 135 to capacitor 130 through transistor T3. The voltage $V_{out}$ is quickly restored. There is an overshoot in $V_{out}$ (shown in curve 30) and the fast comparator/differential amplifier turns T3 off. $V_{out}$ is now restored within the active period itself.

Control 1 and control 2 are conventional circuits, well known to those skilled in the art. Control 1 is similar to the prior art circuit controlling pump 100. It senses the voltage on output node 150 and, when it is less than its nominal value by a threshold amount, turns on pump 100. Control 2 is similar, except that it contains logic preventing it from turning transistor T2 on when transistor T1 is on. Optionally, control circuit 112 could have logic overriding the normal sequence in order to maintain a minimum amount of charge on capacitor 135. A circuit designer will make a design decision on the relative priority to award to the two charge systems.

While the invention has been described in terms of a single preferred embodiment, those skilled in the art will recognize that the invention can be practiced in various versions within the spirit and scope of the following claims.

What is claimed is:

1. An integrated circuit comprising a set of logic subcircuits;

an on-chip power supply controllably connected to a circuit output terminal and to a charge storage terminal;

a decoupling capacitor connected to said output terminal and maintained at an output voltage;

a charge storage capacitor connected to said charge storage terminal and maintained at a storage voltage greater in magnitude than said output voltage; and controllable connection means for connecting said output terminal and said charge storage terminal, in which;

said connection means forms a path between said output terminal and said charge storage terminal when the voltage on said output terminal differs from a reference voltage by a threshold amount, whereby charge flows from said charge storage capacitor to said decoupling capacitor to restore the voltage on said output terminal to said output voltage.

2. A circuit according to claim 1, in which said controllable connection means comprises a restoring transistor connected between said circuit output terminal and said charge storage terminal, and a voltage comparator circuit for turning on said restoring transistor when said output voltage differs from said reference voltage by more than said threshold amount, whereby said controllable connection means operates to restore said output voltage.

3. A circuit according to claim 1, in which said power supply is connected through first and second transistors to said output terminal and to said charge storage terminal, respectively, said first transistor being controlled with a first priority to charge said decoupling capacitor and said second transistor being controlled with a second priority, lower than said first priority, to charge said charge storage capacitor.

4. A circuit according to claim 2, in which said power supply is connected through first and second transistors to said output terminal and to said charge storage terminal, respectively, said first transistor being controlled with a first priority to charge said decoupling capacitor and said second transistor being controlled with a second priority, lower than said first priority, to charge said charge storage capacitor.

5. A circuit according to claim 1, in which said charge storage capacitor has a charge storage capacitance that is smaller than a decoupling capacitance of said decoupling capacitor.

6. A circuit according to claim 2, in which said charge storage capacitor has a charge storage capacitance that is smaller than a decoupling capacitance of said decoupling capacitor.

7. A circuit according to claim 3, in which said charge storage capacitor has a charge storage capacitance that is smaller than a decoupling capacitance of said decoupling capacitor.

8. A circuit according to claim 1, in which said power supply is connected through first and second transistors to said output terminal and to said charge storage terminal, respectively, said first transistor being controlled with a first priority to charge said decoupling capacitor and said second transistor being controlled such that said charge storage capacitor is only charged when said decoupling capacitor is not being charged.

9. A circuit according to claim 2, in which said power supply is connected through first and second transistors to said output terminal and to said charge storage terminal, respectively, said first transistor being controlled with a first priority to charge said decoupling capacitor and said second transistor being controlled such that said charge storage capacitor is only charged when said decoupling capacitor is not being charged.

10. A circuit according to claim 3, in which said power supply is connected through first and second transistors to said output terminal and to said charge storage terminal, respectively, said first transistor being controlled with a first priority to charge said decoupling capacitor and said second transistor being controlled such that said charge storage capacitor is only charged when said decoupling capacitor is not being charged.

11. A circuit according to claim 1, in which said decoupling capacitor is connected between said output terminal and ground and said charge storage capacitor is connected between said charge storage terminal and ground.

12. A circuit according to claim 11, in which said controllable connection means comprises a restoring transistor connected between said circuit output terminal and said charge storage terminal, and a voltage comparator circuit for turning on said restoring transistor when said output voltage differs from said reference voltage by more than said threshold amount, whereby said controllable connection means operates to restore said output voltage.

13. A circuit according to claim 11, in which said power supply is connected through first and second transistors to said output terminal and to said charge storage terminal, respectively, said first transistor being controlled with a first priority to charge said decoupling capacitor and said second transistor being controlled with a second priority, lower than said first priority, to charge said charge storage capacitor.

14. A circuit according to claim 12, in which said power supply is connected through first and second transistors to said output terminal and to said charge storage terminal, respectively, said first transistor being controlled with a first priority to charge said decoupling capacitor and said second transistor being controlled with a second priority, lower than said first priority, to charge said charge storage capacitor.

15. A circuit according to claim 11, in which said charge storage capacitor has a charge storage capacitance that is smaller than a decoupling capacitance of said decoupling capacitor.

16. A circuit according to claim 12, in which said charge storage capacitor has a charge storage capacitance that is smaller than a decoupling capacitance of said decoupling capacitor.

17. A circuit according to claim 13, in which said charge storage capacitor has a charge storage capacitance that is smaller than a decoupling capacitance of said decoupling capacitor.

18. A circuit according to claim 11, in which said power supply is connected through first and second transistors to said output terminal and to said charge storage terminal, respectively, said first transistor being controlled with a first priority to charge said decoupling capacitor and said second transistor being controlled such that said charge storage capacitor is only charged when said decoupling capacitor is not being charged.

19. A circuit according to claim 12, in which said power supply is connected through first and second transistors to said output terminal and to said charge storage terminal, respectively, said first transistor being controlled with a first priority to charge said decoupling capacitor and said second transistor being controlled such that said charge storage capacitor is only charged when said decoupling capacitor is not being charged.

20. A circuit according to claim 12, in which said charge storage capacitor has a charge storage capacitance C2 that is C1/n where C1 is the decoupling capacitance of said decoupling capacitor and n is the storage voltage factor and the product of n and the ripple voltage of said circuit is the difference between the output voltage and the storage voltage.

* * * * *